Figure 1:
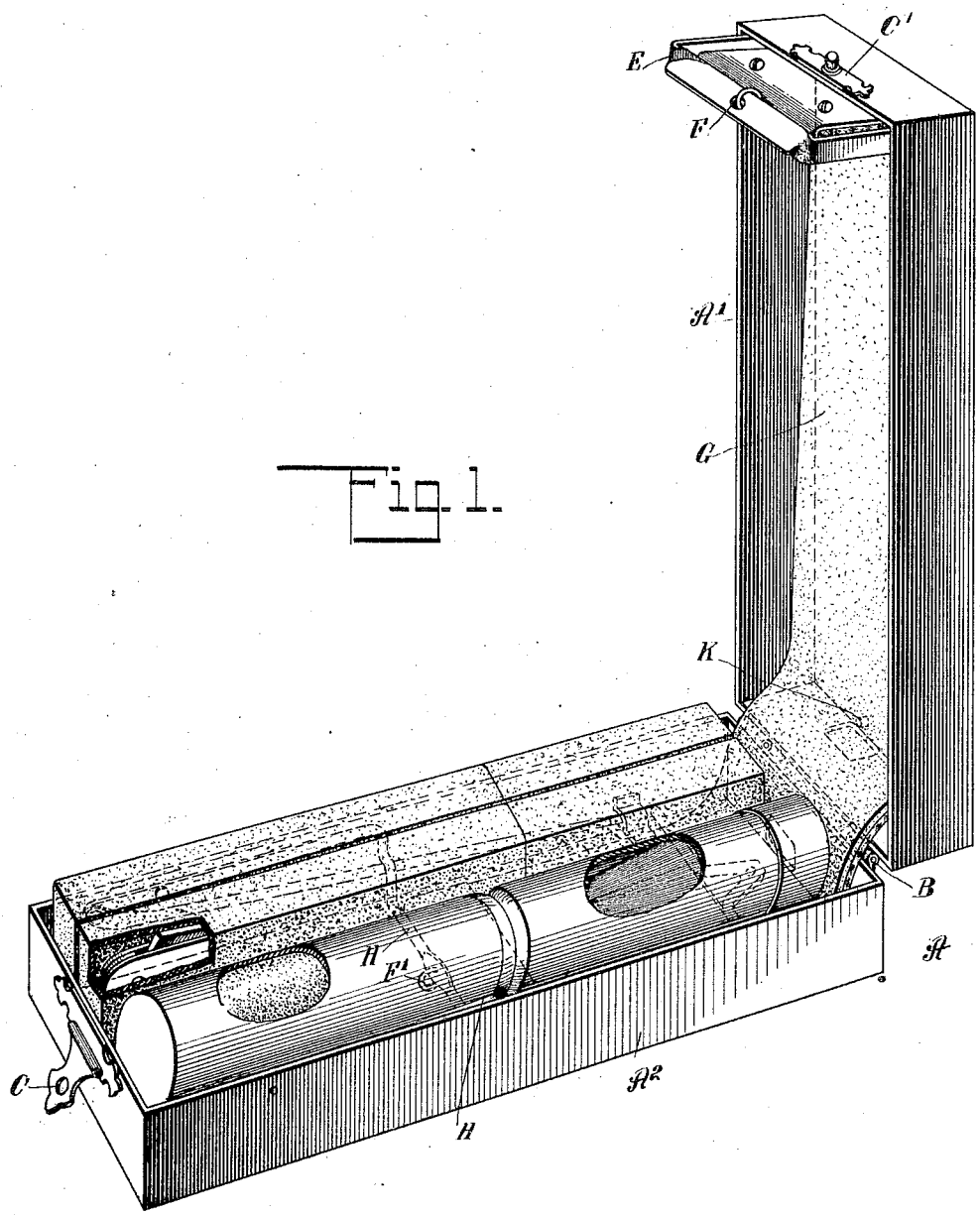

J. W. HAWKINS.
SHAVING SET.
APPLICATION FILED AUG. 7, 1909. RENEWED DEC. 10, 1910.

998,576.

Patented July 18, 1911.
2 SHEETS—SHEET 1.

WITNESSES

INVENTOR
Joseph W. Hawkins
BY
ATTORNEYS

J. W. HAWKINS.
SHAVING SET.
APPLICATION FILED AUG. 7, 1909. RENEWED DEC. 10, 1910.
998,576.
Patented July 18, 1911.
2 SHEETS—SHEET 2.
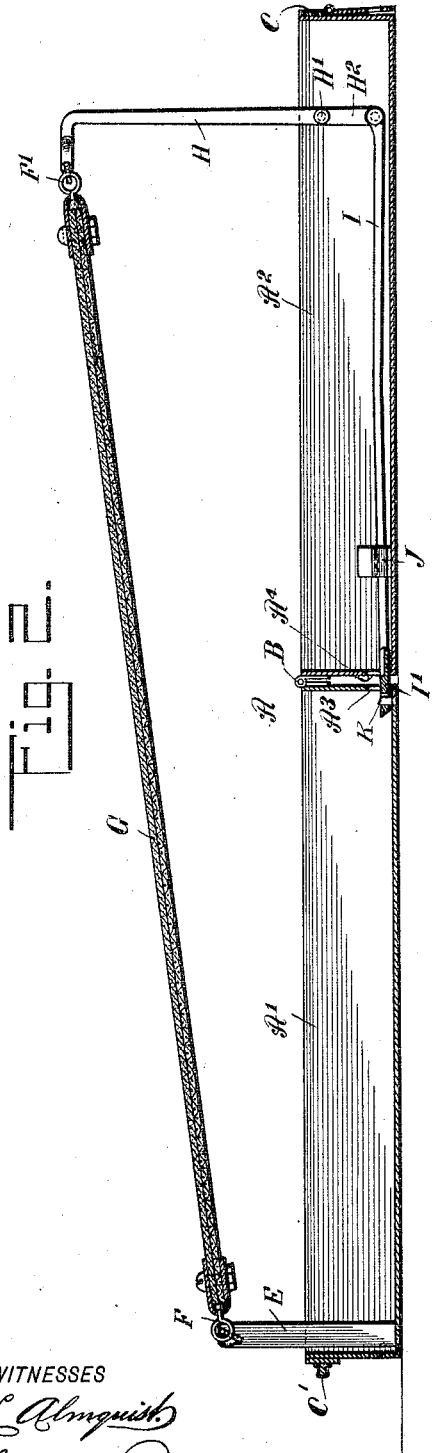
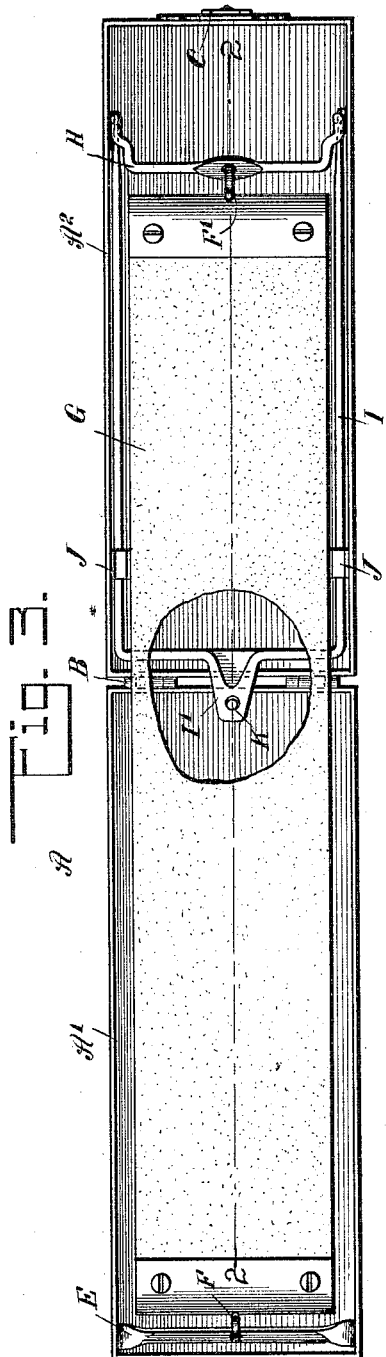
WITNESSES
INVENTOR
Joseph W. Hawkins
BY
ATTORNEYS

UNITED STATES PATENT OFFICE.

JOSEPH WALTER HAWKINS, OF PASSAIC, NEW JERSEY.

SHAVING SET.

998,576. Specification of Letters Patent. Patented July 18, 1911.

Application filed August 7, 1909, Serial No. 511,728. Renewed December 10, 1910. Serial No. 596,714.

*To all whom it may concern:*

Be it known that I, JOSEPH W. HAWKINS, a citizen of the United States, and a resident of Passaic, in the county of Passaic and State of New Jersey, have invented a new and Improved Shaving Set, of which the following is a full, clear, and exact description.

The object of the invention is to provide a new and improved shaving set, containing in very compact form one or more ordinary razors, a strop, brush and soap, the arrangement being such that the strop can be conveniently placed in a stretched position above the casing for containing the enumerated articles. For the purpose mentioned the casing is made in two parts hinged together at adjacent ends, and the strop is supported at its ends on brackets carried by the casing parts.

A practical embodiment of the invention is represented in the accompanying drawings forming a part of this specification, in which similar characters of reference indicate corresponding parts in all the views.

Figure 1 is a perspective view of the shaving set, showing the casing partly opened and parts of the contents of the casing broken out; Fig. 2 is a longitudinal section of the casing in open position and the strop held stretched above the casing, the section being on the line 2—2 of Fig. 3; and Fig. 3 is a plan view of the same, part of the strop being broken out.

The casing A, is formed of two parts or sections $A'$ and $A^2$, connected with each other at adjacent ends by hinges B, to permit of swinging the casing parts into closed or open position. The outer ends of the casing sections $A'$ and $A^2$ are provided with suitable fastening devices C, C′, for fastening the sections together when the casing is closed. In the outer end of the casing section $A'$ is secured a bracket E, extending a short distance above the top of the section $A'$, and the bracket E is connected by a swivel F with one end of a razor strop G, connected at its other end by a swivel F′ with a bracket H, fulcrumed at H′ on the sides of the casing part $A^2$ near the outer end thereof, as plainly indicated in Figs. 2 and 3.

The bracket H is provided with an extension $H^2$, pivotally connected with a locking bolt I, mounted to slide lengthwise in bearings J, arranged in the casing part $A^2$, as plainly indicated in Figs. 2 and 3. The bolt I is provided with an apertured beveled head I′, adapted to pass through apertures $A^3$, $A^4$, formed in the adjacent ends of the casing parts $A'$ and $A^2$, so that the head I′ passes into the casing part $A'$ to engage a pin K, attached to the bottom of the casing part $A'$.

When the bracket H is swung downward into the casing part $A^2$, then the bolt I is in withdrawn position—that is, is contained within the casing part $A^2$—and the strop G is now folded within the two casing parts $A'$ and $A^2$, to allow of conveniently closing the said casing parts. When the casing parts are swung into open position and the bracket H is swung upward by the operator, as indicated in Figs. 2 and 3, then the bolt I is moved lengthwise in the casing and its head I′ passes through the registering openings $A^4$, $A^3$, to finally snap onto the pin K, to lock the casing sections $A'$, $A^2$ in extended position, and also to lock the bracket H in upright position, holding the strop G stretched above the top of the open casing A, as will be readily understood by reference to Figs. 2 and 3.

From the foregoing it will be seen that by the arrangement described, the razor can be readily stropped on the strop G at the time the latter is held in stretched condition above the top of the open casing A, and the several parts can be conveniently stored in the casing and the latter closed and locked by the fastening devices C, C′.

It is understood that when the casing A is open and its parts extended, and the strop G is in stretched position, the razor can be readily stropped without danger of coming in contact with the casing, as the strop is held in stretched condition a distance above the casing, and the strop is also held in a slightly inclined position to allow convenient stropping. After stropping, the operator lifts the head I′ out of engagement with the pin K, to unlock the casing parts $A'$, $A^2$ and the bracket H, to allow of swinging the bracket H into folded position and the casing parts into closed position.

Having thus described my invention, I claim as new and desire to secure by Letters Patent:

1. A shaving set provided with a casing, a strop held in the casing, and means, whereby the strop will be held stretched above the casing when the casing is open and folded within the casing when the casing is closed.

2. A shaving set provided with a casing made in parts hinged together, a strop having one end connected with one part of the casing, and means for connecting the other end of the strop with the other part of the casing, whereby the strop will be held stretched above the casing when the casing is open and folded within the casing when the casing is closed.

3. A shaving set provided with a casing made in parts hinged together, a strop, and suspending and folding means on the parts of the said casing for attaching the ends of the strop, the strop folding in the casing when the latter is closed and stretching on opening the casing.

4. A shaving set provided with a casing made in parts hinged together, a strop, suspending and folding means on the said casing for attaching the ends of the strop, the strop folding in the casing when the latter is closed and stretching on opening the casing, and a locking device controlled by the said suspending means for locking the casing in open position.

5. A shaving set provided with a casing made in parts hinged together to open and close, a strop, and a suspending device held in the casing for supporting the strop in stretched condition above the open casing.

6. A shaving set provided with a casing made in parts hinged together to open and close, a strop, and a suspending device held in the casing for supporting the strop in stretched condition above the open casing, the said device releasing the strop on closing the casing to fold the strop within the casing.

7. In combination, a shaving set casing adapted to open and close, a strop, and means in the said casing for supporting the strop and folding the same in the casing on closing the latter, the said means supporting the strop in stretched position above the casing on opening the latter.

8. A casing made in parts hinged together at adjacent ends, a bracket fixed on the outer end of one casing part, a bracket pivoted in the other casing part and adapted to fold therein, and a strop attached at its ends to the said brackets.

9. A casing made in parts hinged together at adjacent ends, a bracket fixed on the outer end of one casing part, a bracket pivoted in the other casing part and adapted to fold therein, a strop attached at its ends to the said brackets, and a bolt connected with the said pivoted bracket and adapted to lock the casing parts in extended positions.

10. A casing made in parts hinged together at adjacent ends, a bracket fixed on the outer end of one casing part, a bracket pivoted in the other casing part and adapted to fold therein, a strop attached at its ends to the said brackets, a bolt pivotally connected with the said pivoted bracket and having an apertured head adapted to pass through the adjacent ends of the casing parts, and a pin on the said casing part having the fixed bracket, the said bolt head being adapted to engage the said pin to lock the casing parts in extended position and to lock the pivoted bracket in erect position.

In testimony whereof I have signed my name to this specification in the presence of two subscribing witnesses.

JOSEPH WALTER HAWKINS.

Witnesses:
CLAIR W. FAIRBANK,
PHILIP D. ROLLHAUS.

---

Copies of this patent may be obtained for five cents each, by addressing the "Commissioner of Patents, Washington, D. C."